July 17, 1962 G. SIEBOL 3,044,332
METHOD OF MAKING RIVET PINS
Filed Feb. 17, 1959 2 Sheets-Sheet 1
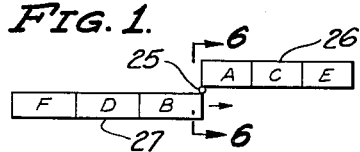
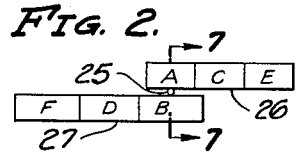
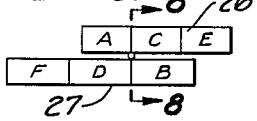
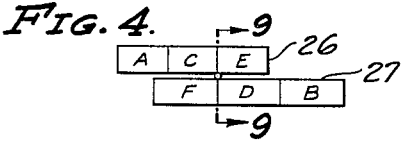
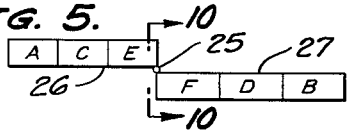
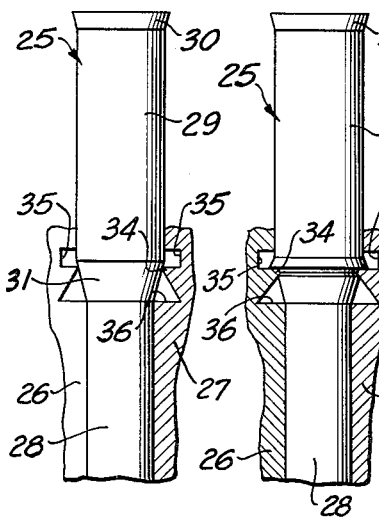
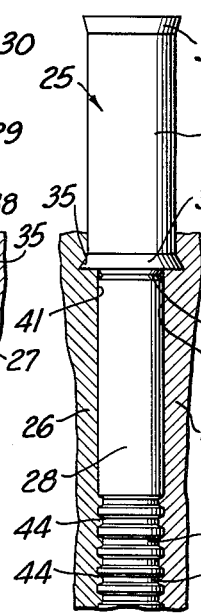
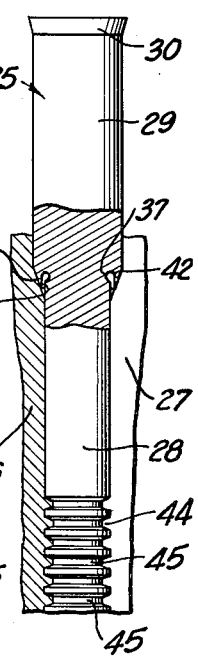
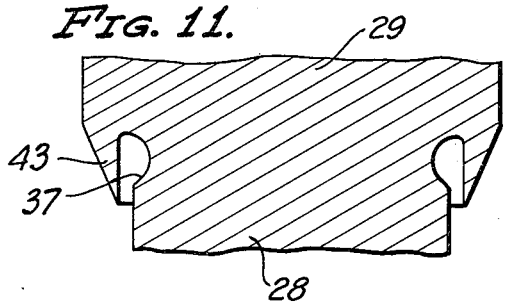
INVENTOR
GEORGE SIEBOL
BY HIS ATTORNEYS
HARRIS, KIECH, RUSSELL & KERN July 17, 1962  G. SIEBOL  3,044,332
METHOD OF MAKING RIVET PINS
Filed Feb. 17, 1959  2 Sheets-Sheet 2
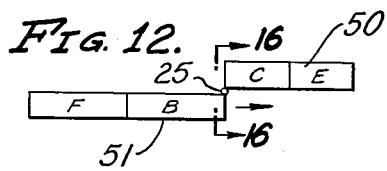
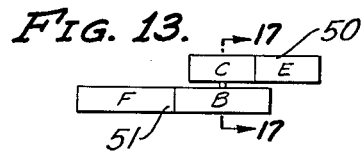
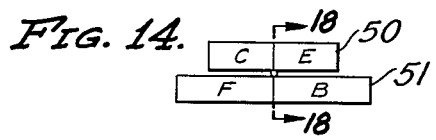
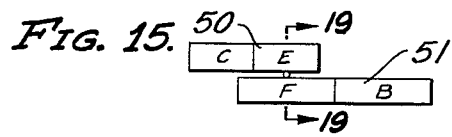
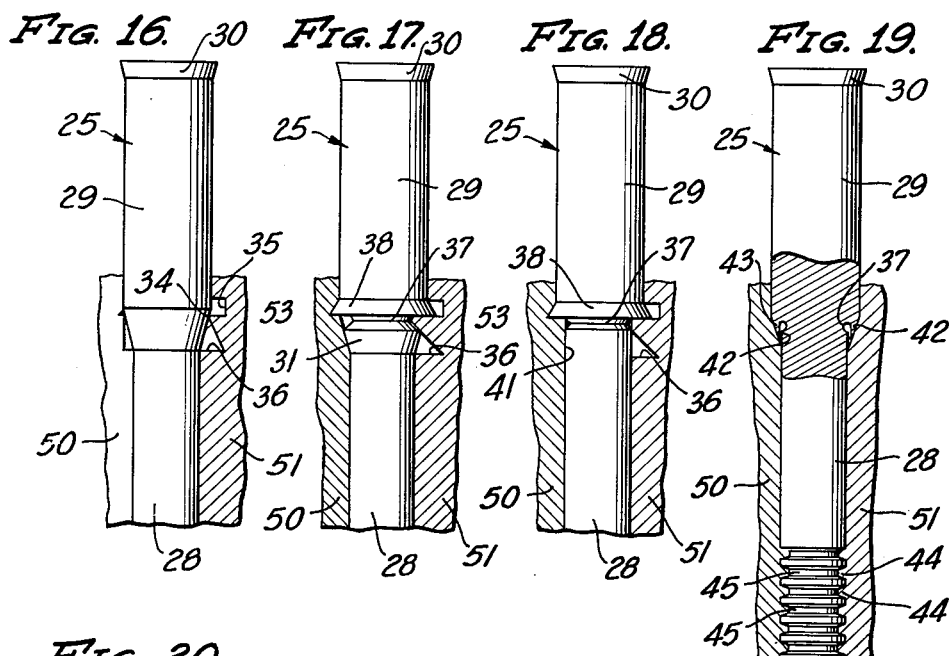
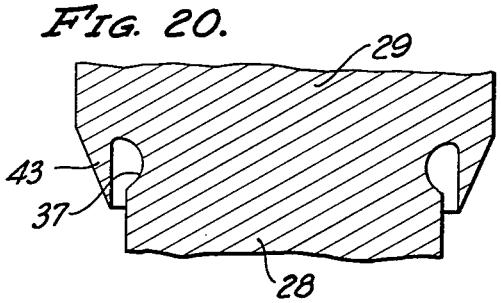
INVENTOR
GEORGE SIEBOL
BY HIS ATTORNEYS
HARRIS, KIECH, RUSSELL & KERN 3,044,332
METHOD OF MAKING RIVET PINS
George Siebol, Anaheim, Calif., assignor to Olympic Screw & Rivet Corporation, Downey, Calif., a corporation of California
Filed Feb. 17, 1959, Ser. No. 793,798
1 Claim. (Cl. 80—60)

This invention relates to a method of making pins and, in particular, to pins suitable for use in blind rivet assemblies and the like.

It is an object of the invention to provide a method of making a pin for a rivet assembly or the like with the resultant pin having a skirt between the shank and stem, which skirt encloses an annular recess and which tapers toward the stem permitting pulling of the shank into a tubular rivet with the skirt expanding at the end of the pull on engaging the anvil of the setting gun. A further object is to provide a method for making such a pin wherein the recess has a minimum diameter less than that of the stem providing a breakneck for separating the stem and shank.

It is an object of the invention to provide a method of making a pin for use in rivet assembly such as that shown in my copending application entitled "Blind Rivet and Method of Setting," Serial No. 780,721, filed December 16, 1958, and assigned to the same assignee as the present application.

It is an object of the invention to provide a method of making such a pin by rolling in a thread rolling machine. A further object is to provide a method wherein the skirt and recess are formed in a single pass through a thread rolling machine which may at the same time form the grooves which provide a grip for the pulling member of the rivet setting tool.

It is an object of the invention to provide a method of making a rivet pin by rolling a circumferential groove in the pin between the shank and stem thereof and a circumferential flange between the groove and shank and rolling the flange over the groove to form the tapered skirt and enclosed recess. A further object is to provide such a method wherein the stem adjacent the groove is of substantially the same diameter as the remainder of the stem. Another object is to provide such a method wherein the stem diameter is rolled at the same time the groove and flange are being formed. Another object is to provide such a method wherein the stem diameter is increased during the groove rolling phase and is subsequently reduced prior to the rolling over of the flange.

Other objects, advantages and features of the invention will more fully appear in the course of the following description. The drawings merely show and the description merely describes preferred embodiments of the present invention which are given by way of illustration or example.

In the drawings:

FIGS. 1 through 5 diagrammatically represent the operation of a thread rolling machine following the method of the invention;

FIGS. 6 through 10 are enlarged sectional views taken along the section lines of FIGS. 1 through 5, respectively;

FIG. 11 is an enlarged view of a portion of FIG. 10;

FIGS. 12 through 15 diagrammatically represent the operation of a thread rolling machine following an alternative embodiment of the invention;

FIGS. 16 through 19 are enlarged sectional views taken along the section lines of FIGS. 12 through 15, respectively; and FIG. 20 is an enlarged view of a portion of FIG. 19.

In FIG. 1, a pin blank 25 is positioned between die plates 26, 27 of a conventional thread rolling machine. In such machines, one plate, here the plate 26, is ordinarily stationary and the other plate is moved past the first plate rolling the blank therebetween from the initial position of FIG. 1 to the final position of FIG. 5 with the finished pin then dropping into a receptacle. The surfaces of the die plates which contact the blanks are contoured to roll various desired shapes into the blank during its pass between the plates. In the method of the invention, a number of operations are carried out on the blank in its single pass through the machine to form the desired rivet pin.

The pin blank 25 is initially formed in the shape shown in FIG. 6 by extruding or other conventional operations and has a stem 28 and shank 29 of greater diameter than the stem. An expanded head 30 may be formed on the shank when desired and a tapered section 31 may provide a transition from the shank to the stem.

Each of the die plates is provided with a plurality of zones having different shapes to produce different contours in the workpiece, the zones being identified by the letters A, C, E, and B, D, F. In the embodiment of FIGS. 1–11, both zone A of plate 26 and zone B of plate 27 are provided with a knife edge 34 and relieved areas 35, 36 above and below the knife edge respectively. The projection of the knife edge and thereby its penetration into a pin blank increases along the plate toward the next succeeding zone for rolling a circumferential groove 37 in the pin between the shank and stem, the minimum diameter of the groove preferably being less than the diameter of the stem. This rolling operation produces a circumferential flange 38 which projects into the area 35 of the die plates and an increase in the diameter of the stem below the groove projecting into the relieved areas 36. FIGS. 6, 7 and 8 show the shapes of the pin and the die plates at the beginning, intermediate and final stages of this rolling step.

In the next phase of the rolling operation, the enlarged portion of the stem below the groove, including any remaining portion of the tapered section 31, is reduced to substantially the diameter of the remainder of the stem. Also, the flange 38 is formed to the prefererd shape as shown in FIG. 9 having a planar lower surface and a conical upper surface. In the zones C and D of the plates 26, 27, the knife edge 34 and the lower relieved area 36 are eliminated providing a substantially flat surface 41 up to the flange 38. The upper relieved area 35 is reduced to produce the desired flange shape. FIG. 9 shows the pin following this phase of the rolling operation, leaving the groove 37 and the flange 38 between the stem 28 and shank 29.

Each of the zones E and F of the plates 26, 27 is provided with a sloping surface 42 joining the upper surface which contacts the shank and the lower surface which contacts the stem, this sloping surface serving to roll the flange 38 over from its outwardly projecting position as shown in FIG. 9 to the axially projecting position of FIG. 10. This rolled over flange now serves as the desired skirt which encloses the groove 37 forming a recess having an open end facing toward the stem end of the pin. The outer surface of the skirt 43 tapers from the shank toward the stem for guiding the shank into the rivet as described in my aforesaid copending application.

Each of the die plates is preferably also provided with a plurality of parallel groove forming projections 44 to produce a plurality of grooves 45 in the lower end of the stem 28 at the same time the recess 37 and skirt 43 are being formed, these grooves functioning as grippable means for pulling of the pin by the setting tool.

FIGS. 12 through 20 illustrate an alternative embodiment of the invention which is especially adapted for use with thread rolling machines having a short stroke and, hence, requiring relatively short die plates. In this embodiment, the process of forming the annular groove 37 and the flange 38 and the diameter of the stem adjacent the groove are carried out simultaneously. Die plates 50 and 51 are each divided into two zones, the zones C and E of the plate 50 corresponding to the same zones on the plate 26 and the zones B and F of the plate 51 corresponding to the same zones on the plate 27.

As the pin blank passes between the zones B and C, the knife edge 34 of the plate 51 forms the annular groove 37 while the groove 53 and the surface 41 of the plate 50 provide the desired shape for the flange 38 and reduce the stem diameter to the shape shown in FIG. 18. The zones E and F of the plates 50, 51 are designed and function in the same manner as in those of the previously-described embodiment to produce the finished pin as shown in FIG. 19.

Thus it is seen that by the method of the invention, the desired rivet pin can be formed from the pin blank in a single pass through a thread rolling machine wherein the groove, the flange and the desired stem diameter are rolled successively or simultaneously and then the flange is rolled over the groove producing the desired recess and enclosing skirt. Other work, such as the formation of a series of tool gripping grooves, can be carried out on the pin blank simultaneously with the formation of the groove and skirt combination.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

A method of making a pin for a blind rivet assembly or the like, using a blank having a shank and a stem of lesser diameter than the shank, wherein the pin is formed in a single pass of the blank between a pair of die plates, comprising the steps of, sequentially, rolling a circumferential groove in the pin between the shank and stem while displacing material to one side thereof to form a circumferential flange between the groove and shank, confining said flange to having a substantially flat surface adjacent the groove and a conical surface remote from the groove tapering inwardly to said shank, with the groove of lesser diameter than the stem and the flange of greater diameter than the shank, rolling material displaced to the other side of said groove to substantially the same diameter as the remainder of the stem, and then rolling the flange over to a frustoconical shape having the base diameter of the shank and converging from the shank toward the stem to overlay the stem and substantially close the groove.

References Cited in the file of this patent

UNITED STATES PATENTS

| | | |
|---|---|---|
| 1,446,447 | Bingham | Feb. 27, 1923 |
| 1,913,143 | Robertson | June 6, 1933 |
| 2,172,553 | Tripp | Sept. 12, 1939 |
| 2,661,526 | Bruegger | Dec. 8, 1953 |
| 2,825,251 | Rader | Mar. 4, 1958 |